Sept. 20, 1949.  H. W. WILLIAMS  2,482,529
ELEVATOR SYSTEM
Filed Oct. 7, 1946  7 Sheets-Sheet 1

WITNESSES:

INVENTOR
Harold W. Williams.
BY
ATTORNEY

Sept. 20, 1949.    H. W. WILLIAMS    2,482,529
ELEVATOR SYSTEM
Filed Oct. 7, 1946    7 Sheets-Sheet 3
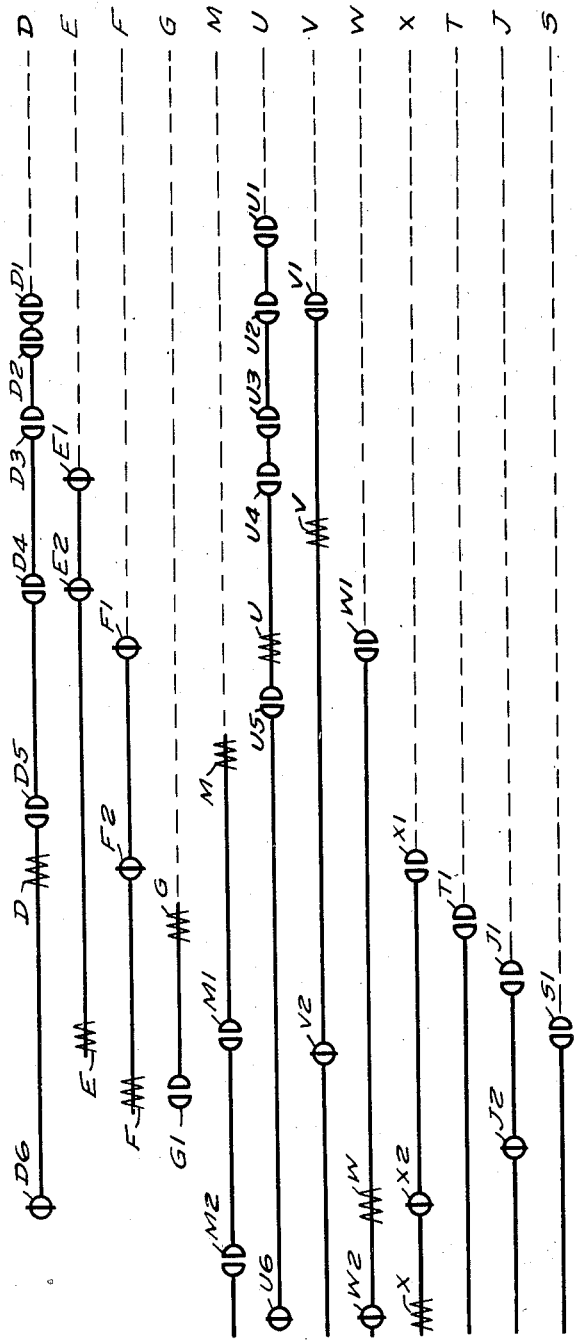
WITNESSES:
E.A. M?Closkey.
Birney Hines
Fig. 3A.
INVENTOR
Harold W. Williams.
BY
ATTORNEY Patented Sept. 20, 1949

2,482,529

UNITED STATES PATENT OFFICE 2,482,529

ELEVATOR SYSTEM

Harold W. Williams, Nutley, N. J., assignor to Westinghouse Electric Corporation, East Pittsburgh, Pa., a corporation of Pennsylvania Application October 7, 1946, Serial No. 701,729

18 Claims. (Cl. 187—29)

My invention relates to systems of control for electric elevators and more particularly to systems of this character which include a number of elevator cars operating together as a bank.

Although not limited thereto, my invention is particularly applicable to elevator systems in which the cars are driven at relatively high speeds and are automatically stopped at the floor landings in response to the operation of push-buttons at the floor landings and in the cars. Such systems are for tall buildings having many floors to be served and having a relatively large passenger travel.

One object of my invention is to provide automatic control means which will cause the cars to render efficient and prompt service to all of the passengers, even though the passengers are unevenly distributed at the floor landings.

Another object is to provide automatic control means which will, when a loaded car bypasses a floor having a stop call, cause some other car to promptly answer such stop call by stopping at the bypassed floor.

A further object is to provide a control system for elevator cars in which the bypassing of a floor by a car will, when a predetermined number of calls accumulate at floors in a predetermined service demand zone, automatically cause some other car to stop at such floors and answer the stop calls thereat.

A further object is to provide a control system in which any car may be automatically caused to give special service to floors having unanswered stop calls.

A still further object is to provide a control system which will, when a down car bypasses a down stop call at a floor, cause an up moving car to stop, reverse and answer the unanswered down call.

Other objects of my invention will become evident from the following detailed description taken in conjunction with the accompanying drawings, in which.

Figure 1:
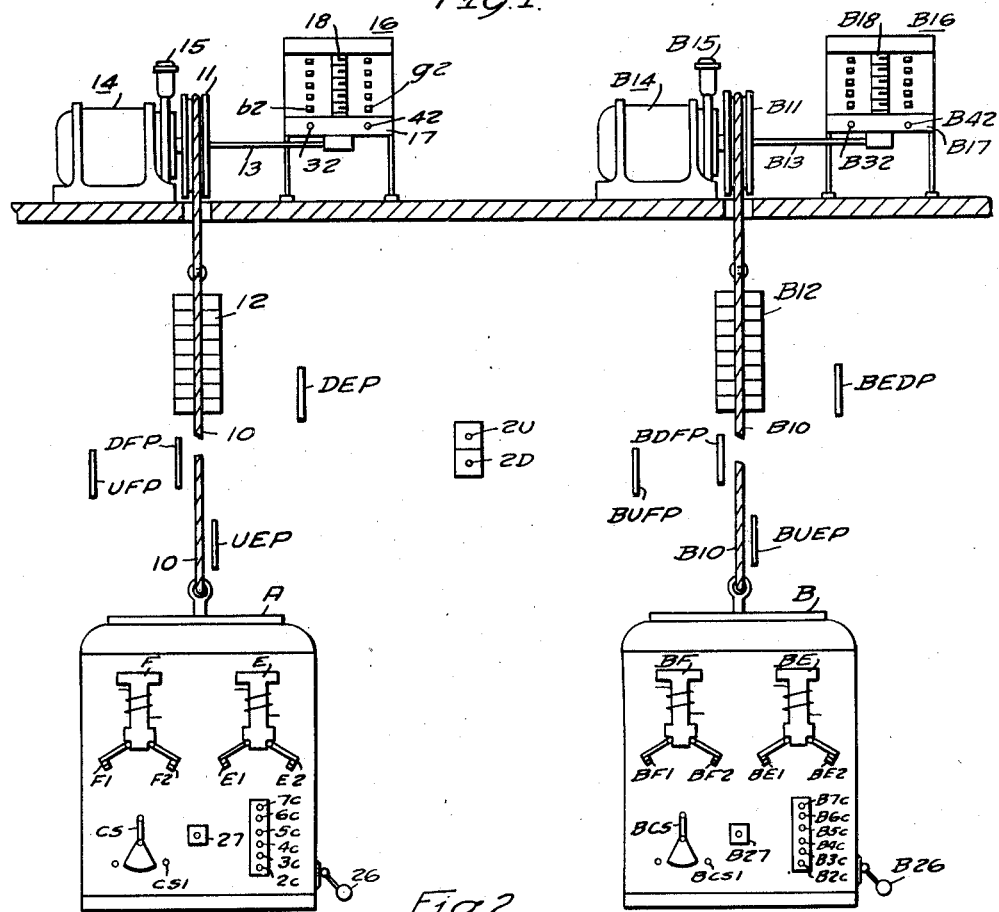
Figure 1 is a diagrammatic representation of an elevator system embodying my invention.
Figure 3:
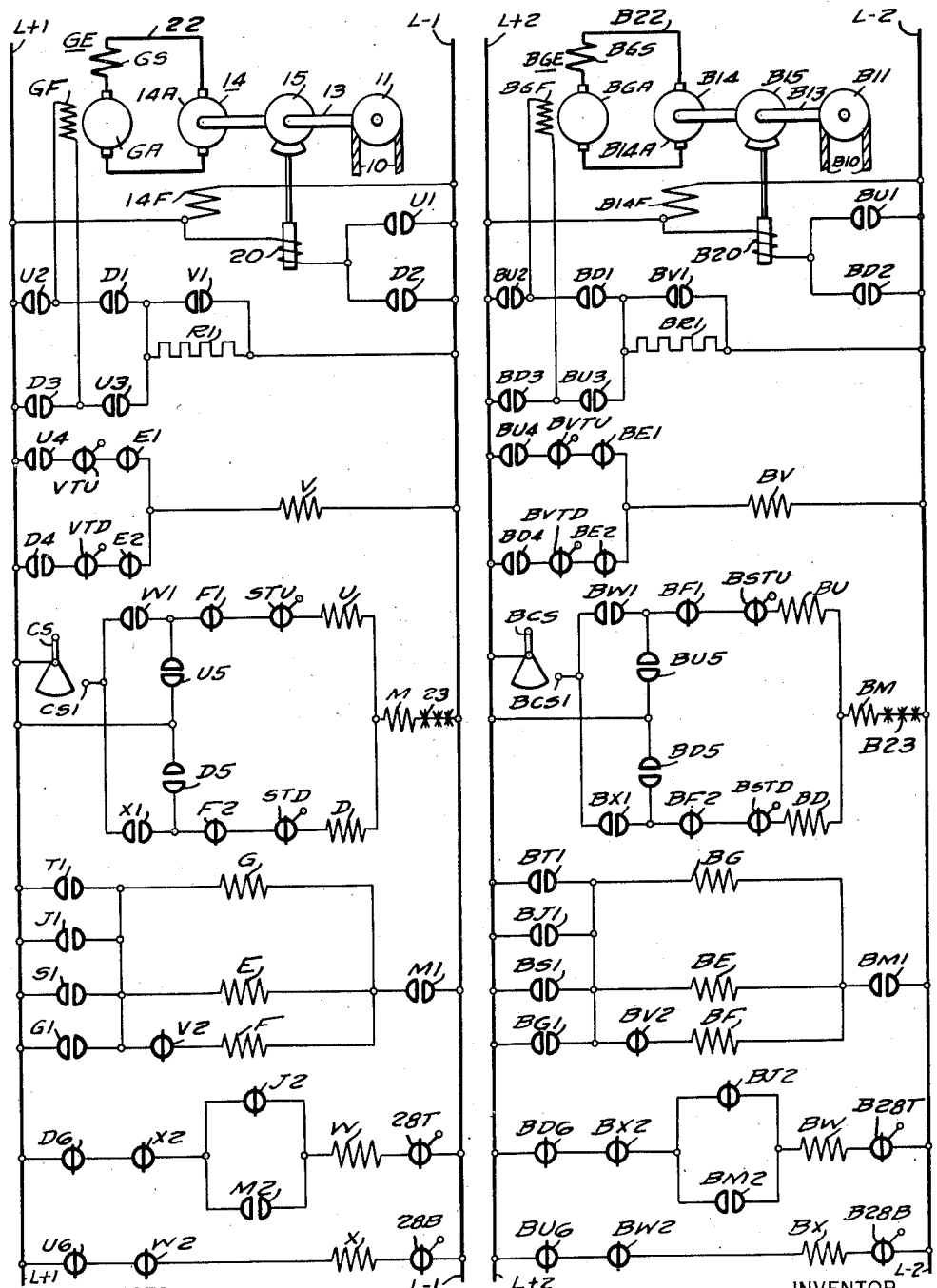
Figure 4:
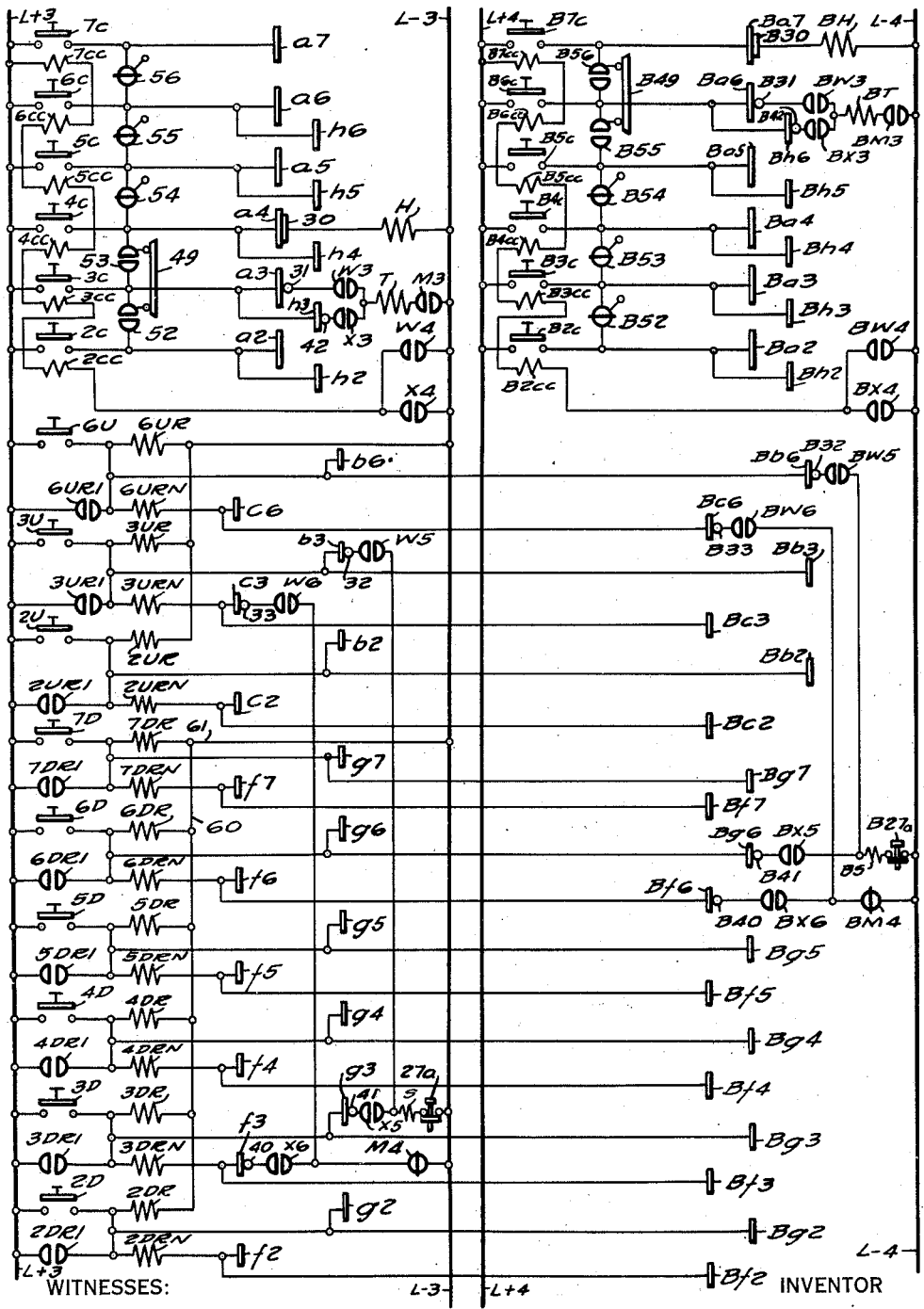
Figure 4A:
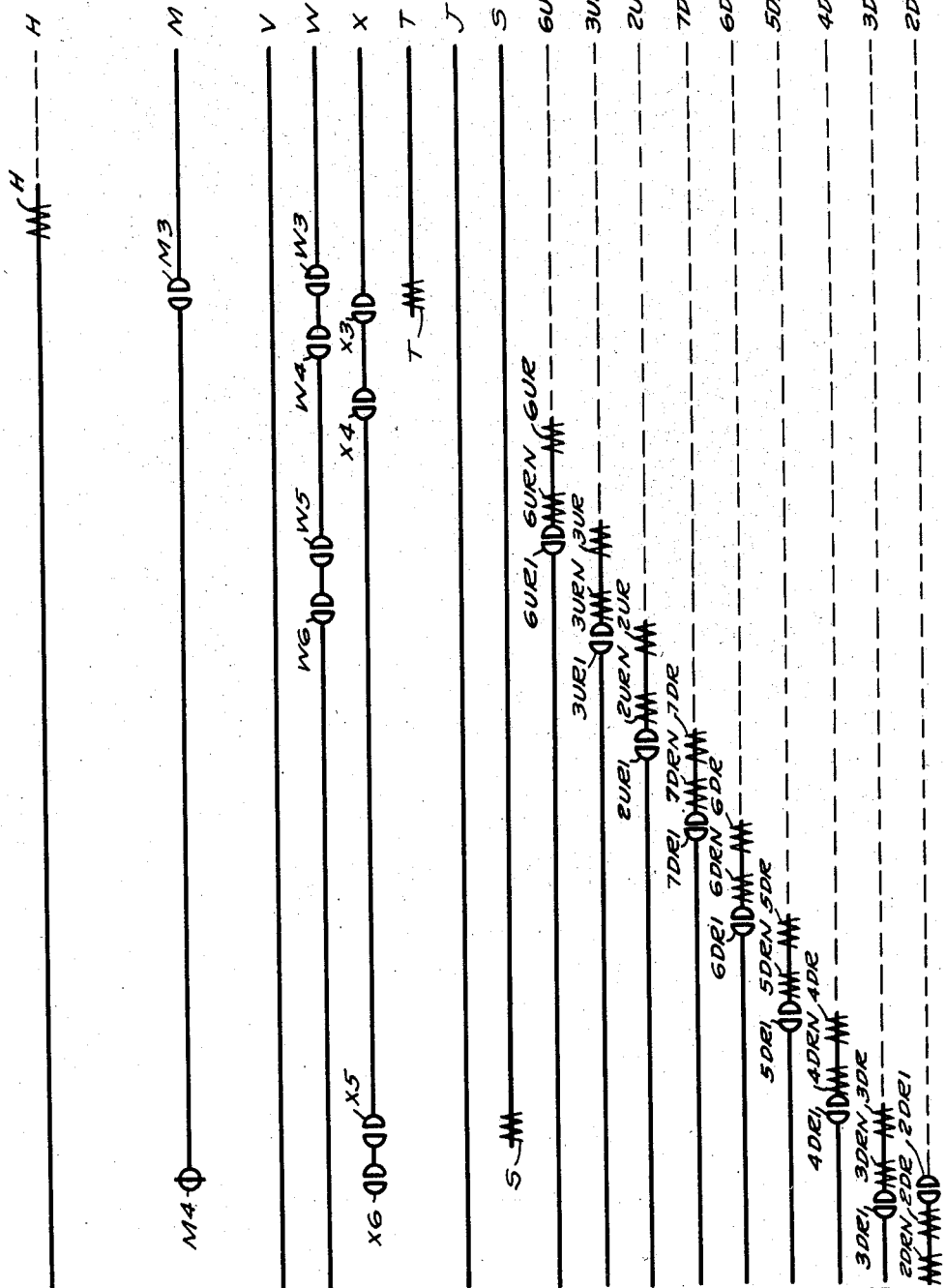
Figure 5:
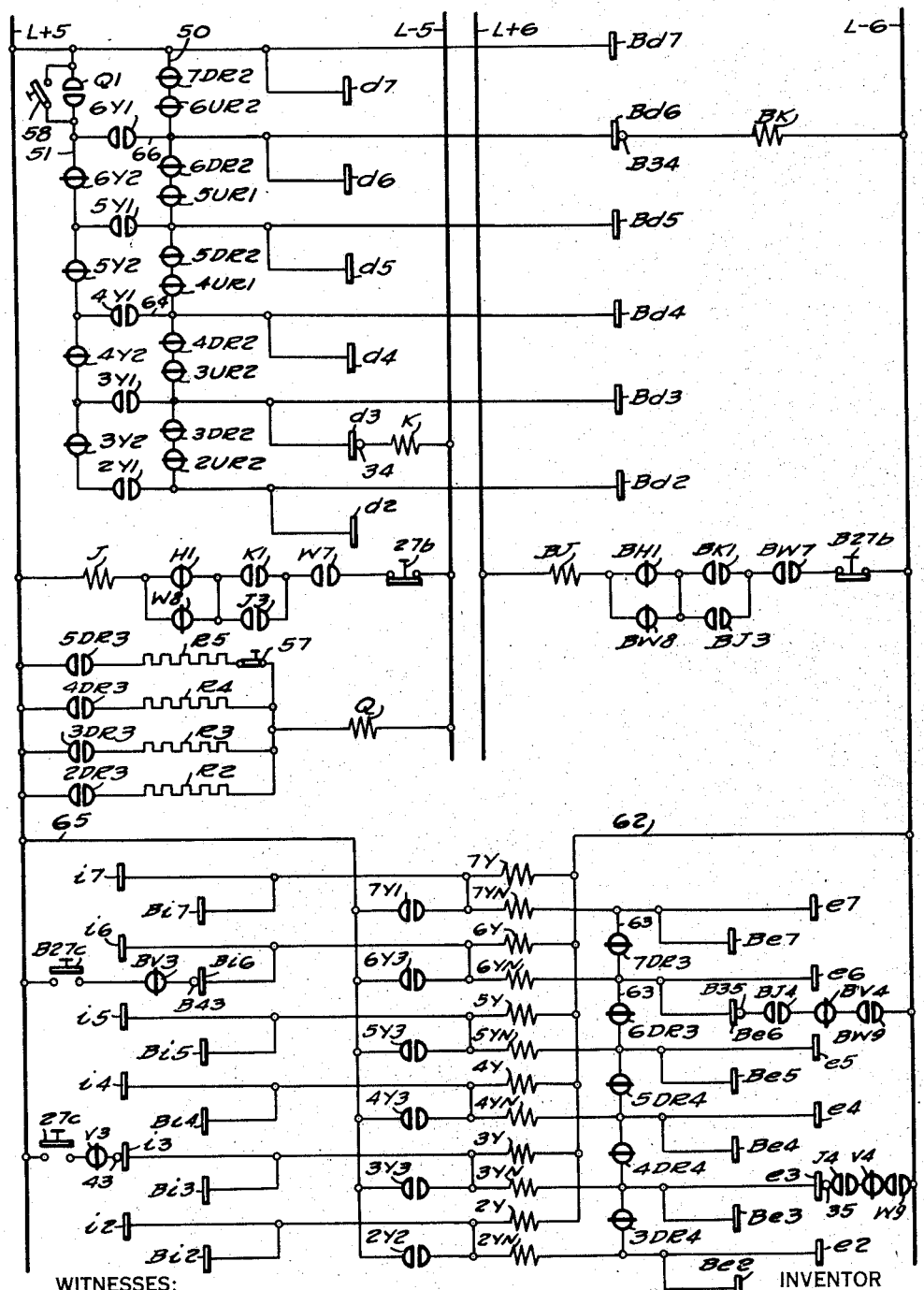
Figure 5A:
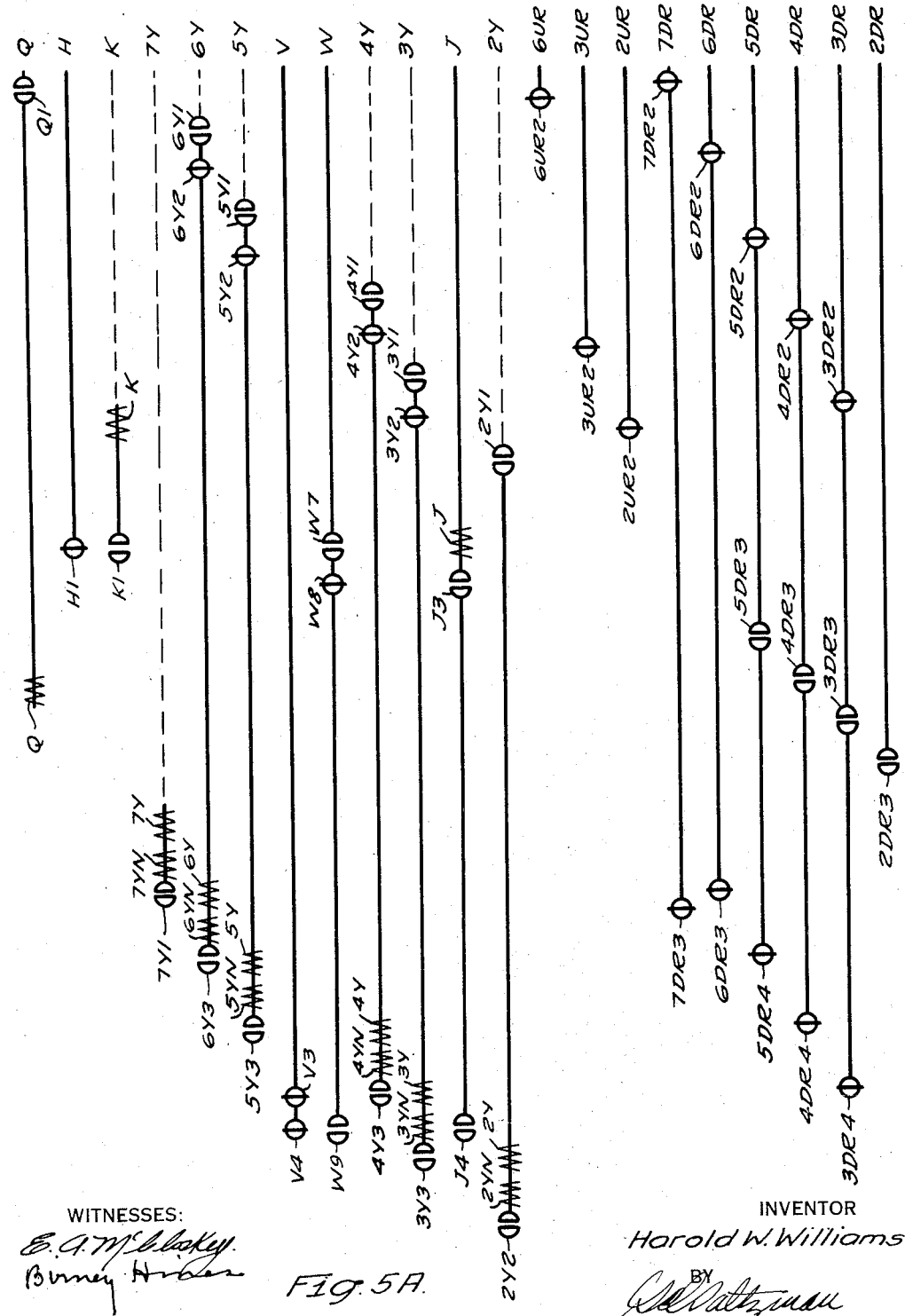

Figs. 3, 4, and 5 collectively constitute a straight line drawing of the circuit connections for the two car elevator installation illustrated in Fig. 1. The figures should be assembled in vertical order with Fig. 3 at the top.

Figs. 3A to 5A inclusive, are key representations of the relays in Figs. 3 to 5 inclusive, illustrating the coils and the contact members of such relays disposed in horizontal alignment with their brushes in the straight line circuits of Figs. 3 to 5. Figs. 3A to 5A should be placed beside the corresponding Figs. 3 to 5 to facilitate the location of the various coils and contacts.

The elevator system illustrated is provided with two cars A and B for serving seven floors. This number of cars and this number of floors have been selected for the purpose of simplifying the disclosure as much as possible, but it is to be understood that the invention may be used for any reasonable number of cars in a bank serving any desired number of floors. For example, the invention may be used for an installation of six cars serving thirty floors.

For the sake of simplicity, the apparatus individual to each car will be given the same reference characters except that the apparatus for car B will be given the prefix B to indicate that it is for car B instead of for car A.

Apparatus individual to car A c—car buttons
cc—car button holding coils
D—down switch
E—slow-down inductor relay
F—stopping inductor relay
G—inductor holding relay
H—high car call relay
J—high call reversing relay
K—high floor call relay
L—supply conductors
M—car running relay
P—inductor plates
R—resistors
S—floor call stopping relay
T—car call stopping relay
U—up direction switch
V—high speed relay
W—up direction preference relay
X—down direction preference relay
Y—special service relays
27—by-pass switch

Apparatus common to all cars

DR—down floor call storing relays
UR—up floor call storing relays
Q—quota relay

Apparatus in Fig. 1 of the drawings

Referring more particularly to Fig. 1 of the drawings, car A is illustrated as supported in a hatchway by a cable 10 which passes over a sheave 11 to a counterweight 12. The sheave 11 is mounted for rotation by a shaft 13 driven by a motor 14. A brake 15 of the usual spring-applied, electro-magnetically-released type is provided for stopping rotation of the sheave 11 when the motor 14 is deenergized.

A floor selector 16, of any suitable type, is provided for connecting the various electrical circuits of the system in accordance with the position of car A. The shaft 13 is extended to operate a brush carriage 17 on the floor selector 16 by mechanically rotating a screw-threaded shaft 18 on which the carriage is mounted. The carriage 17 is provided with a number of brushes which are disposed, upon movement of the car, to successively engage stationary contacts arranged in rows on the selector in position to correspond to the floors of the building. For simplicity, only two brushes, up brush 32 and down brush 42, and two rows of contact segments, up segments $b2$ and down segments $g2$, etc., disposed to be engaged by them are illustrated in Fig. 1, but it will be understood that in the system to be described herein, as well as in practice, a much larger number of brushes and rows of contact segments is required. Owing to the friction between the carriage 17 and the screw-threaded shaft 18, the up brushes will engage the up segments only while the car is going up and the down brushes will engage the down segments only while the car is going down. Other forms of selectors may be substituted for the selector shown, if desired.

A starting switch CS is mounted in the car to be operated by the attendant to start the car. When the car switch is rotated anticlockwise, it closes its contacts CS1 to start the car for the direction for which it is conditioned to operate. When the car switch is centered, it leaves the control system of the car in such condition that the car can be stopped by operation of hall buttons at the floor landings or by stop buttons in the car. It is to be understood that the car may be operated by the car switch or that any suitable control means may be substituted for the car switch. The illustration of the car switch is used for simplicity in describing the system.

The car buttons $2c$, etc. (one for each floor) are mounted in the car, so that the attendant may, by operating them, cause the car to stop automatically at any floor. The direction of operation of the car is automatically controlled by direction relays W and X, as will be described in connection with Fig. 3.

The hall buttons are mounted at the floor landings, in order that waiting passengers may cause the cars to stop thereat. An up button and a down button are provided at each floor intermediate the terminals. A down button is disposed at the top terminal and an up button at the bottom terminal. Fig. 1 illustrates only the up hall call button 2U and the down hall call 2D for the second floor.

In order to automatically effect accurate stopping of car A at the floors in response to operation of the car stopping buttons $2c$, etc., or the hall call buttons 2U, 2D, etc., a slow-down inductor relay E and a stopping inductor relay F are mounted on the car in position to cooperate with suitable inductor plates of iron or other magnetic material, mounted in the hatchway adjacent to each floor. Only the up plates UEP and UFP and the down plates DEP and DFP for the second floor are illustrated. Similar plates are provided for each floor, except that the top terminal has only up plates and the bottom terminal only down plates.

The inductor relays E and F, when their coils are energized, have normally incomplete magnetic circuits which are successively completed by the inductor plates as the car approaches a floor at which a stop is to be made. These relays are so designed that energization of their operating coils will not produce operation of their contacts until the relay is brought opposite its inductor plate, thereby completing the relay magnetic circuit. Upon operation of the relay contacts (such as E1 or E2) they remain in operated condition until the relay operating coil is deenergized, even though the inductor relay moves away from the position opposite the inductor plate which completed its magnetic circuit. The plates should be so spaced in the hatchway as to provide desirable distances for slowdown and stopping of the cars at the floors. Other methods of controlling slowing down and stopping of the cars may be used if desired.

A push-button switch 27 is provided in car A to permit the attendant to by-pass the calls ahead of his car when it is loaded or whenever he desires to operate the car straight through. This switch is also provided with additional contacts for calling into operation certain relays when special service demands exist.

Figure 2:
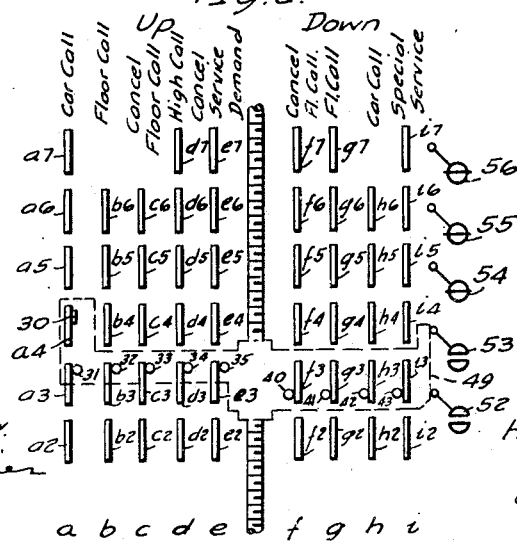
Fig. 2 is a diagrammatic representation of the stationary contact segments and the moving brushes on a floor selector for one of the cars embodied in Fig. 1, with the brushes disposed in the position they will take when the car is stopped at the third floor.

*Apparatus in Fig. 2*

Fig. 2 illustrates an enlarged view of the floor selector 16 of Fig. 1. In this figure, the various stationary contact segments are represented by rectangles and the contacting brushes by small circles. The brush carriage 17 is shown by dotted lines in the position it occupies when its car is at the third floor.

The contact segments $a2$ to $a7$ inclusive on the floor selector are disposed to be successively engaged by the brush 30 to control the high car call relay H and by the brush 31 for completing stop circuits set up by the call push-bottons in the car for up direction stops. The brush 30 should be long enough to bridge adjacent contact segments.

The contact segments $b2$ to $b6$ inclusive and the brush 32 are for connecting the circuits of the hall stop buttons 2U, etc., for up stops. The up contact segments $c2$ to $c6$ inclusive and the brush 33 are provided for connecting circuits for cancelling stop calls registered by the up hall call buttons 2U, etc. The up contact segments $d2$ to $d7$ inclusive and the brush 34 connect circuits for the high call relay to be described later. The contact segments $e2$ to $e7$ inclusive and the brush 35 connect circuits whereby a car may cancel special service demand calls when it answers such special service demands.

The down cancel contact segments $f2$ etc., and brush 40, the down floor call contact segments $g2$, etc., and brush 41, and the down car call contact segments $h2$ etc., and brush 42 are provided for connecting circuits for the down direction in the same manner as described for the up direction. The down contact segments $i2$ through $i7$ and brush 43 connect circuits whereby a down car which by-passes a stop call at a floor may set up a service demand to stop an up car.

On the right-hand side of the floor selector, a series of switches 52 to 56 are illustrated as disposed to be operated by a cam 49 on the carriage 17 as it moves from its floor to floor position, for the purpose of controlling the high car call circuit set up by brush 34.

Apparatus in Fig. 3

In Fig. 3, the control circuits individual to car A are shown on the left-hand side, and the circuits individual to car B are shown on the right.

The motor 14 is provided with an armature 14A which is mechanically connected to the shaft 13 for driving the sheave 11. The brake 15 is provided with a winding 20 which is energized on energization of the motor 14. The motor 14 includes the usual shunt-type main field winding 14F, which is connected for energization across the supply conductors L+1 and L−1. The armature 14A is connected for energization by a loop circuit 22 to a generator GE provided with an armature GA.

In order to control the direction and magnitude of the voltage generated by the generator armature GA, a separately-excited main field winding GF is provided for the generator GE. A field resistor R1 is included in the circuit of the field winding GF to provide speed control for the motor 14. The generator GE is provided with suitable means such as a series field winding GS for correcting the speed regulation of motor 14.

The starting switch CS of car A is here shown as connected to control the energization of the operating windings of an up direction switch U and a down direction switch D. The direction switches U and D are provided with contact members for connecting the generator field winding GF to the conductors L−1 and L+1 in accordance with the direction in which the car is to operate. When either the up or the down switch U or D is energized, the car running relay M is also energized to condition certain circuits for car operation. The common circuit of the reversing switches U and D and the running relay M includes the usual safety devices indicated diagrammatically at 23.

A high-speed relay V is provided for short-circuiting the resistor R1 disposed in series circuit relation with the generator field winding GF to apply the maximum voltage to that winding for operating the car at normal high speed. This relay is controlled by the switches U and D on starting and by the slowdown inductor relay E when stopping.

An upper and a lower mechanical limit switch VTU and VTD, are provided for interrupting the circuit of the high-speed relay V when the car reaches a proper slow-down point in advance of the upper and lower terminals, respectively, and an upper and a lower stopping limit switch STU and STD, are provided for opening the circuits of the reversing switches U and D at the terminal limits, in accordance with the usual practice.

An up direction preference relay W and a down direction preference relay X are provided for controlling the direction of operation of the car and performing certain functions in connection therewith. The operating windings of these relays are controlled by a top limit switch 23T, a bottom limit switch 23B and the high-call reversal relay J. Each of the limit switches 23T and 28B is arranged to be opened when car A arrives at the corresponding terminal, thereby interrupting the circuit of the direction preference relay W or X corresponding to the direction of operation of the car. Also, when the high call reversal relay J is operated while the car is between terminals, the relays W and X are operated to reverse the direction switches. Hence the car attendant does not need to do anything except close the car switch CS temporarily to start the car and operate the car call buttons temporarily to cause the car to stop to let off passengers.

The energizing coils for the slowdown inductor switch E and the stopping inductor switch F, are arranged to be energized by the closing of the contacts S1 of a hall call stopping relay S, or the contacts T1 of a car button relay T, or the contacts J1 of the high call reversing relay J. (The operating coils for relays S and T are illustrated in Fig. 4 and the coil for relay J is illustrated in Fig. 5 and will be described in connection therewith.)

An inductor holding relay G is provided for maintaining the inductor relays in energized condition during decelerating and stopping operations.

Apparatus in Fig. 4

The car buttons 2c, etc., described in connection with Fig. 1, are illustrated with their holding coils 2cc, etc. and circuits in the upper part of Fig. 4, in connection with the high car call relay H and the stopping relay T. The coils 2cc, etc., are energized, when the car starts in either direction, to hold in the car buttons 2c, 3c, etc., as they are operated, until the direction of the car is reversed, so that the temporary operation of a car button by the attendant will cause it to remain in operated condition until the car is reversed.

The high car call relay H is used to prevent relay J (Fig. 5) from reversing the car at the highest registered floor call when a stop call for a floor above is registered on the stop buttons in the car. It is connected by brush 30 to the row of contact segments a2, etc., on the floor selector 16, so that it will be energized whenever a stop call is registered on one of the stop buttons in car A for a floor above the car. The switches 52 to 56, inclusive, operated by the cam 49, are shown as disposed in the circuits of the car buttons to prevent energization of the relay H by operated stop buttons in car A for floors below that car.

The car stopping relay T is connected to the up brush 31 engaging the row of contact segments a2, etc., and to the down brush 43 engaging the row of contact segments h2, etc.; so that, when a call is registered on a car button and the car approaches the energized contact segment corresponding thereto, relay T will be energized to stop the car by energizing the inductor relays F and E.

The floor buttons 2U, 2D, etc., described in connection with Fig. 1 are shown with their circuits in the lower part of Fig. 4. Associated with each floor button is a call registering or storing relay by means of which the momentary pressing of the button will set up or register a stop call which will hold itself until it is answered by the stopping of a car at that floor for the direction of the registered call. The call registering relays are designated as 2DR to 7DR for the down direction and as 2UR, 3UR and 6UR for the up direction. For simplicity, the up direction call registering relays and floor buttons for only the second, third and sixth floors are shown, as the up buttons and registering relays for the other floors will be readily understood.

The down call registering relays, when energized, close circuits to the row of contact segments g2, etc., and the up registering relays, when energized, close circuits to the row of contact segments b2, etc., on the floor selector so that the contact segment for a floor for which a call is registered is energized as long as the call exists.

A car stopping relay S is shown as connected to the up brush 32 engaging segments b2, etc., and the down brush 42 engaging segment g2, etc. When the car approaches a floor in a direction for which a call is registered, the crorresponding brush engages the energized contact segment for that floor and that direction and thereby causes the relay S to be energized, which, in turn, energizes the inductor relays F and E of that car to effect the stopping of that car at that floor.

A cancellation coil is wound in opposition to each call registering coil and connected to the cancellation contact segments on the floor selector. The up cancellation coils are designated as 2URN, etc., and are connected to the up segments c2, etc., and the down cancellation coils as 2DRN, etc., connected to the down segments f2, etc. As the brush 33 moves over the segments c2, etc., and the brush 41 moves over the segments f2, etc., they energize the cancellation coil for any floor at which the car stops to answer a stop call, in accordance with its direction of operation.

*Apparatus in Fig. 5*

The cars and their control apparatus are provided for operation, under normal conditions, as a high call reversal system in which the cars stop for up calls on their up trips but automatically stop and reverse at the highest down call when there is no service required above the highest down call. The high floor call relay K and the high call reversing relay J effect this result.

The high floor call relay K of car A controls the operation of the high call reversing relay J for that car in accordance with the existence or non-existence of registered floor calls above it. A high call circuit 50 is provided for connecting the relays K or BK to the supply conductor L+5. The high call circuit 50 includes back contacts of the up and down call registering relays arranged in series relation according to the natural sequence of the floors and is connected at floor points with the contact segments d1, d2, etc. Consequently, when car A is traveling upwardly, its relay K will not be energized as long as a call exists at any floor above the floor of the contact segment on which the brush 34 rests, but as soon as the brush reaches a segment for a floor with no stored call above it, a circuit for the relay K is completed to cause it to energize the relay J.

The high call reversing relay J is operated by the relay K under certain conditions to so prepare the circuits of car A that it will stop and reverse its direction of operation at the floor corresponding to the highest registered down call in the high zone when it is running upwardly and has no stop call registered on its car buttons for a floor above the highest down call. In such cases, relay J stops the car by closing its contacts J1 in the circuit of the inductor relays E and F (Fig. 3) and it then reverses it by opening its contacts J2 in the circuit of the up direction preference relay W (Fig. 3).

However, there are times when the number of down calls becomes so large that some of the down cars become so loaded that they cannot take on any more down passengers and are forced to by-pass further down floors, thus leaving the down passengers thereat without prompt service. Therefore, the system is also provided with an auxiliary circuit 51 for the relays K and BK and a plurality of service demand relays 2Y, etc., one for each floor, for cooperation with the by-pass means so as to cause an unloaded up moving car to stop and reverse at the highest down call at or below a floor at which a by-pass is operated to take on down passengers thereat without continuing its up trip.

The service demand relays 2Y, etc., are connected for energization by the operation of the by-pass button 27 in a car when it makes a down stop at a floor and becomes so loaded that it cannot take on any more passengers. When a service demand relay (3Y, etc.) is energized, it opens contacts, such as 3Y2, and closes contacts, such as 3Y1, in the service demand circuit 51 to cause energization of the high floor call relay K of the next unloaded up moving car for stopping and reversing that car at the floor of the highest operated down call device at or below the floor at which the bypass was operated.

Each service demand relay (2Y, etc.) is provided with a cancelling coil (2YN, etc.) so that a car answering a service demand will cause the demand relay (2Y, etc.) to be restored to its normal condition. Although the drawings show a service demand relay for each floor above the lower terminal, they may be omitted from the upper floors where it is not desired to have a bypass effective to reverse the next up empty car, if desired.

In many installations, it is desirable to prevent the service demand relays from causing the stopping and reversing of an empty up car until the down service demand becomes sufficient to become a special service demand or, in other words, where there is a down service demand at not only one floor but at several floors, so that the plurality of unanswered down calls become a special service demand. The quota relay Q is provided for this purpose and effects it by counting the number of floors at which a down call exists, and, when they exceed a predetermined number by then rendering effective the auxiliary circuit 51 controlled by the service demand relays to cause the next unloaded up car to answer such special service demand.

The quota relay Q may be connected to the down call registering means for each floor if desired but usually it is found to be preferable to connect the relay Q to the down call registering means of only a selected group of the lower floors which may be called a service demand zone.

In the present instance, the service demand zone has been selected as including the 2nd, 3rd, 4th and 5th floors. The energization of the quota relay is controlled by a plurality of branch circuits, one for each floor in the service demand zone and each of which includes a quota resistor, such as R2, controlled by contacts operated by the down floor call relays, such as 2DR, in the service demand zone. The quota relay and the resistors, together with their connections, should be so proportioned that the relay will be responsive to a predetermined quota of registered down calls in the service demand zone.

For example, as long as no down call is registered in the service demand zone, the relay Q will not be energized. If only one down call in the service demand zone is registered, relay Q will still remain unoperated because sufficient current will not flow through the one resistor to actuate relay Q. But, assuming a quota of two, as soon as two down calls in the service demand zone are registered, sufficient current will flow through the two resistors in parallel to actuate relay Q.

The resistor circuit for the 5th floor includes a manually operative switch 57 so that the system may be easily adjusted to include or exclude the 5th floor from the group of floors selected as the service demand floors for controlling the relay Q. Similar switches may be included in the other resistor circuits leading to relay Q if desired.

If it is desired at any time to operate the system without the relay Q so that the by-pass operation of a car will cause an unloaded up car to stop and reverse at the next down call below the floor at which the bypass occurred, it may be effected by closing the switch 58 around the contacts Q1 and thereby rendering the relay Q ineffective to control the circuit 51.

Although the present illustration shows the quota relay Q as connected for a service demand zone comprising the down stop calls at the 2nd, 3rd, 4th, and 5th floors, it will be readily apparent that any desired floors may be included or excluded from the service demand zone. It will also be apparent that the service demand system may be readily applied to the up direction stop calls so that a service demand in the up direction will effect the stopping and reversing of an empty down car, if desired.

If the car attendant desires, for any reason, to go above the highest down call or above any service demand call while on an up trip, he can do so by pressing a car call button for a floor above, such as the top floor, to cause the car to keep on up to such floor. He can also render his car exempt from service demand operation by pressing the top floor car button each time he starts from the parking floor.

*Operation of high call reversal*

It will be assumed that cars A and B are standing at the lower terminal with the doors (not shown) closed and with no stop calls registered. Under these conditions, the up direction preference relay W of car A is energized by the circuit L+1, D6, X2, J2, W, 28T, L—1. The up direction preference relay BW of car B is energized by a similar circuit. The switch 58 in the auxiliary high call circuit 51 (Fig. 5) is open to render the quota relay Q effective to cause an unloaded up car to reverse in response to the by-pass of a down call when a predetermined quota of down calls, say two, exists in the low zone.

It will be assumed now that waiting down passengers at the 4th and 6th floors operate the down call buttons 4D and 6D to register down stop calls thereat.

The operation of the button 4D energizes the relay 4DR by the circuit L+3, 4D, 4DR, 60, 61, L—3 to close its self-holding contacts 4DR1 and to energize the stopping segments g4 and Bg4 to stop the next down car. The relay 4DR also opens its contacts 4DR2 in the high call circuit 50 to prevent operation of the high floor call relays K and BK. The energized relay 4DR also closes its contacts 4DR3 in the circuit of quota relay Q but it does not operate for that one call.

The operation of button 6D energizes the relay 6DR by the circuit L+3, 6D, 6DR, 60, 61, L—3. The energized relay 6DR closes its contacts 6DR1 to supply energy to its self-holding circuit and to the contact segments g6 and Bg6 to stop the next down approaching car. The operated relay 6DR also opens its contacts 6DR2 in the high call circuit 50 for preventing operation of the high floor call relays K and BK.

It will be assumed now that the attendant in car A closes the car switch CS temporarily to start the car upwardly and thereby energizes the up direction switch U and the car running relay M through the circuit: L+1, CS, CS1, W1, F1, STU, U, M, 23, L—1.

The energized relay M closes its contacts M1, M2, and M4 and opens its contacts M3 to prepare the control system of car A for operation.

The energized up direction switch U closes its contacts U1, U2, U3, U4 and U5 and opens its contacts U6 to start the car upwardly. The closing of contacts U1 energizes the brake coil 20 to release the brake 15 (Fig. 3). The closing of the contacts U2 and U3 energizes the field winding GF by the circuit L+1, U2, GF, U3, R1, L—1. The energization of the field winding GF causes the generator to supply energy to the hoisting motor 14 for operating the drum 11 to move car A upwardly.

The closing of the contacts U4 energizes the high speed relay V by the circuit L+1, U4, VTU, E1, V, L—1. The energized relay V closes its contacts V1 thereby shorting the resistor R1 in the circuit of the generator field winding GF, thus increasing the energization of the field winding so that the motor 14 now moves the car upwardly at its normal high speed.

As car A moves upwardly with no calls registered above it except the down calls at the 4th and 6th floors, and approaches the 6th floor, its brush 34 engages the energized contact segment d6 and thereby energizes the high floor call relay K by the circuit: L+5, 7DR2, 6UR2, d6, 34, K, L—5. The energized relay K closes its contacts K1 and thereby energizes the high call reversing relay J by the circuit: L+5, J, H1, K1, W1, 27B, L—5.

The energized relay J closes its contacts J1 (Fig. 3) thereby energizing the slow-down inductor relay E and the inductor holding relay G by the circuit L+1, J1, G and E in parallel, M1, L—1 to effect deceleration of the car for the down call stop at the 6th floor. The relay G, in turn, closes its contacts G1 to hold the circuit set up by relay J.

As car A approaches closer to the 6th floor, its inductor relay E comes opposite the up plate UEP for that floor which opens its contacts E1, thus deenergizing the high speed relay V. The relay V opens its contacts V1 thus restoring the resistor R1 to the circuit of the generator field winding GF and thereby decreasing the speed of the hoisting motor 14 and slowing down the car. The relay V also closes its contacts V2, thus energizing the stopping relay F by L+1, G1, V2, F, M1, L—1.

As car A approaches still closer to the 6th floor, its stopping relay F comes opposite the up stopping plate UFP for that floor which opens its contacts F1 thereby deenergizing the car running relay M and the up direction switch U. The switch U opens its contacts U1 in the brake circuit and its contacts U2 and U3 in the circuit of the generator field winding GF, thus stopping the car and applying the brake to hold it at the 6th floor.

At the same time, the contacts J2 of the energized high call reversing relay J are open in one of the parallel circuits of the up direction preference relay W. Therefore, when the contacts M2 of the car running relay M open for the 6th floor stop, they open the other parallel circuit for the relay W and thus deenergize it. The deenergized relay W thereupon closes its back contacts W2 which energize the down preference relay X by the circuit L+1, U6, W2, X, 28B, L—1. The energized down preference relay X closes its contacts X1 in the circuit of the down direction switch D so that the next operation of the car switch CS will start downwardly.

The energization of the down direction relay X also closes its contacts X6 thereby energizing the cancelling coil 6DRN by the circuits L+3, 6DR1, 6DRN, f6, 40 X6, M4, L—3. The energized coil 6DRN deenergizes the relay 6DR and thereby cancels the down call at the 6th floor.

It will be assumed now that the waiting down passenger at the 6th floor enters the car and that the attendant closes the car switch CS thus energizing the down direction switch D and the car running relay M by the circuit L+1, CS, CS1, X1, F2, STD, D, M, 23, L—1. The energized switch D closes its contacts D1, D2, D3 and D4 and opens its contacts D6. The closed contacts D2 energize the brake coil 20 to release the brake 15. The closed contacts D1 and D3 energize the field winding GF by the circuit L+1, D3, GF, D1, R1, L—1 which causes the generator to supply energy to the hoisting motor 14 to start the car downwardly. The closed contacts D4 energize the high speed relay by the circuit L+1, D4, VTD, E2, V, L—1 to close its contacts V1 around the resistor R1, thus causing the car to move downwardly at high speed.

The foregoing description demonstrates how a car will operate on an up trip under normal conditions to reverse itself at the highest down call when there are no up calls above it to be answered.

*Operation of special service demand*

It will be assumed now that car A continues downwardly, passes the 5th floor and approaches the down stop call at the 4th floor. As car A approaches the 4th floor, its down brush 42 engages the contact segment g4, thereby energizing its stopping relay S by the circuit L+3, 4DR1, g4, 42, X5, S, 27a, L—3 to stop it at the 4th floor. The energized relay S closes its contacts S1, thereby energizing the decelerating inductor relay E and the inductor holding relay G by the circuit L+1, S1, G and E in parallel, M1, L—1. As car A approaches closer to the 4th floor, its inductor relay E comes opposite the down plate DEP for that floor, thereby opening its contacts E2 to deenergize the high-speed relay V. The deenergized relay V opens its contacts V1, thereby restoring the resistor R1 to the circuit of the generator field winding GF and thus decreasing the speed of the hoisting motor 14 and slowing down the car. The relay V also closes its back contacts V2, thus energizing the stopping relay F by the circuit L+1, G1, V2, F, M1, L—1.

As car A approaches still closer to the 4th floor, its stopping relay F comes opposite the down stopping plate DFP for that floor, which opens its contacts F2, thereby deenergizing the car-running relay M and the down-direction switch D. The deenergized switch D opens its contacts D2 in the brake circuit and its contacts D1 and D3 in the circuit of the generator field winding GF, thus stopping the car and applying the brake to hold it at the 4th floor. The deenergized relay M closes its contacts M4 thereby energizing the cancelling coil 4DRN by the circuit L+3, 4DR1, 4DRN, f4, 40, X6, M4, L—3 for deenergizing the relay 4DR to cancel the down stop call at the 4th floor. The deenergized relay 4DR opens its contacts 4DR3 in the circuit to the quota relay Q and closes its contacts 4DR4 so that it now has no effect on the service demand relays.

It will be assumed now that car A takes on so many down passengers at the 4th floor that it cannot accommodate any more passengers, and that the attendant in that car therefore operates his bypass button 27 to bypass any down calls registered at the floors below. The button 27 may be held in by the operator as long as he desires to bypass top calls or it may be of the type which will hold itself in until the car arrives at the 1st floor.

The pressing of the bypass button 27 opens its contacts 27a and its contacts 27b and closes its contacts 27c. The opening of the contacts 27a prevents the stopping relay S of car A from being operated by the down stop calls at the floors below so that the car will now pass such calls without stopping and will proceed to the lower terminal, unless the bypass button is released to again permit the car to pick up down stop calls.

The opening of the contacts 27b prevents operation of the high-call reversing relay J of car A while it is on either an up or a down trip. Hence the bypass button may be used to bypass calls on an up trip as well as on down trips.

The closing of the contacts 27c energizes the service demand relay 4Y by the circuit L+5, 27c, V3, 43, i4, 4Y, 62, L—6. The energized relay 4Y closes its contacts 4Y1 in the circuit 64 and opens its contacts 4Y2 in the auxiliary circuit 51 to prepare for the stopping and reversing of the next unloaded up car at the highest down call below the floor at which the bypass button was operated, whenever a quota of unanswered down calls exists in the quota zone. The energized relay 4Y also closes its self-holding contacts 4Y3 so that it will remain energized until its cancelling coil 4YN is energized by an unloaded up-moving car stopping and reversing in answer to the bypass operation.

The arrival and stopping of car A at the 4th floor also causes its down brush 40 to engage the contact segment f4 and thus energizes the restoring coil 4DRN by the circuit L+3, 4DR1, 4DRN, f4, 40, X6, M4, L—3 to cancel the down call at the 4th floor by deenergizing the relay 4DR. The deenergized relay 4DR recloses its back contact 4DR2 in the circuit 50 and recloses its back contacts 4DR4 in the circuit 63 of Fig. 5.

It will be assumed now that the attendant in car A closes the car switch CS, thus energizing the down-direction switch D and the car-running relay M, as described before and the car starts downwardly.

At this point in the operation, it will be assumed that a new down call is registered at the 6th floor and that calls are also registered at the 3rd and 2nd floors by waiting passengers pressing the down buttons 6D, 3D and 2D.

The pressing of button 6D registers a down call at the 6th floor in the same manner as the previous down call at that floor.

The operation of button 3D registers a down call at the 3rd floor by energizing the relay 3DR by the circuit L+3, 3D, 3DR, 60, 61, L—3 to close its contacts 3DR1 to supply energy to its self-holding circuit and to the stopping segments g3 and Bg3 to stop the next down car. The energized relay 3DR also opens its contacts 3DR2 in the high call circuit 50 for preventing operation of the high floor call relays K and BK opens its contacts 3DR4 in the circuit 63 and closes its contacts 3DR3. The closed contacts 3DR3 complete a circuit through the resistor R3 (Fig. 5) to the quota relay Q but the resistor prevents the flow of sufficient current through relay Q to energize it.

The pressing of the button 2D registers a down call at the 2nd floor by energizing the relay 2DR through the circuit L+3, 2D, 2DR, 60, 61, L—3 to close its contacts 2DR1 to supply energy to its self-holding circuit and to the stopping segments g2 and Bg2 to stop the next down car. The energized relay 2DR also opens its contacts 2DR2 in the high call circuit 50 and closes its contacts 2DR6 in the circuit to the relay Q.

The registration of the down call at the 2nd floor in addition to the down call at the 3rd floor completes the quota for a special service demand because the closed contacts 2DR2 complete a circuit through the resistor R2 to the quota relay Q. Inasmuch as current can now flow through the resistors R2 and R3 in parallel to the relay Q, it will receive sufficient current to energize it and cause it to close its contacts Q1 in the auxiliary circuit 51 so that the next unloaded up car will stop at the highest down call below the floor at which the bypass button 27 was operated.

It will be assumed now that car A moves on down to the 1st floor without answering the down calls at the 3rd and 2nd floors and that car B is started on its up trip by the attendant therein closing his car switch BCS.

The closing of the switch BCS energizes the up-direction switch BU and the car running relay BM of car B in the same manner as described in connection with car A and car B now moves upwardly at normal speed.

Car B now passes the 2nd floor and as it approaches the 3rd floor, its brush B34 engages the contact segment Bd3 and energizes its high floor call relay BK by the circuit L+5, Q1, 6Y2, 5Y2, 4Y1, 4DR2, 3UR2, Bd3, B34, Bk, L—6. The energized relay BK closes its contacts BK1 and thereby energizes the high-call reversing relay BJ by the circuit L+6, BJ, BH1, BK1, BW1, B27b, L—6 to close its contacts BJ1 and BJ3 and open its contacts BJ2. The closed contacts BJ3 complete a self-holding circuit for the relay BJ. The closed contacts BJ1 energize the decelerating relay BE and the inductor holding relay BG of car B by the circuit L+2, BJ1, BG and BE in parallel BM1, L—2.

As car B approaches more closely to the 3rd floor, it brings its inductor relay BE opposite its up inductor plate UEP for the 3rd floor, thus causing the relay BE to open its contacts BE1. The opening of the contacts BE1 deenergizes the high-speed relay BV which in turn opens its contacts BV1 and thus restores the resistor BR1 to the circuit of the generator BG, thus decelerating the car. The deenergized relay BV also closes its contacts BV2 and thereby energizes the stopping inductor relay BF.

As car B decelerates and approaches closer to the 3rd floor, it brings its stopping relay BF adjacent the up stopping plate BUFP for the 3rd floor which causes the contacts BF1 to open and thus deenergize the up-direction switch BU and the car-running relay BM of car B. The relay BU opens its contacts BU3 and BU4 in the generator field winding BGF and its contacts BU1 in the circuit of the brake coil B20, thus stopping the hoisting motor of car B and applying the brake B15 to hold the car at the 3rd floor.

Inasmuch as the contacts BJ2 are open in the circuit of the up-direction preference relay BW, the opening of the contacts BM2 when the relay BM is deenergized also deenergizes the relay BW, which thereupon closes its back contacts BW2 in the circuit of the down-direction relay BX, thus energizing that relay by the circuit L+2, BU6, BW2, BX, B28B, L—2. Car B is now stopped at the 3rd floor and its direction preference relays BW and BX have been reversed so that the next time car B is started it will move in the down direction.

It should also be observed that inasmuch as car B has arrived and stopped in the up direction at the 3rd floor and its high call reversing relay J was operated to stop it and reverse it at that floor, it also energized the neutralizing coil 4YN by the circuit L+5, 65, 4Y3, 4YN, 63, 4DR4, Be3, B35, BJ4, BV4, BW9, L—6. The energization of the neutralizing coil 4YN cancels the service demand set up by the energization of the coil 4Y, thus causing it to open its self-holding contacts 4Y3, open its contacts 4Y1 and close its contacts 4Y2 in connection with the demand circuit 51, thereby restoring circuit 51 to its normal condition.

It will be assumed now that car B takes on the down passengers at the 3rd floor and that the attendant closes the switch BCS, whereupon car B starts downwardly, stops at the 2nd floor to answer the down call thereat and then moves on down to the lower terminal.

By this operation, it will be observed that when a down car makes a bypassing operation, it can cause an up-moving car to stop and reverse to take on down passengers at the highest down call below the floor at which the bypassing operation took place when a predetermined service demand exists, thereby giving prompt service to the various floors served by the elevator cars.

Operation of bypassing without quota

It will be assumed now that the switch 58 in the circuit 51 (Fig. 5) is closed to render the quota relay Q ineffective, so that a bypassing operation by any down car will cause the next unloaded up car to stop and reverse at the highest down call below the floor at which the bypass operation took place.

It will be assumed further that car B is standing at the lower terminal, that car A is standing at the upper terminal and that down stop calls are registered at the 6th floor and the 4th floor by the passengers thereat operating the down button 6D and 4D. The operation of the buttons 6D and 4D register down stop calls at the 4th floor and 6th floor in the manner previously described.

It will be assumed also that car A moves down to and stops at the 6th floor and that it takes on so many passengers at that floor that the attendant presses his bypass button 27 so that his car will not make any more down stops for additional passengers.

The operation of the bypass button 27 opens its contacts 27a and 27b and closes its contacts 27c. The opening of the contacts 27a prevents the stopping relay S of car A from being operated by down stop calls at the floors below so that the car will now pass such calls without stopping. The opening of the contacts 27b prevents operation of the high call reversing relay J of car A.

The closing of the contacts 27c energizes the service demand relay 6Y by the circuit L+5, 27c, V3, 43, 16, 6Y, 62, L—6. The energized relay 6Y closes its contacts 6Y1 in the circuit 66 and opens its contacts 6Y2 in the auxiliary circuit 51 to prepare for the stopping and reversing of the next unloaded up car at the highest down call below the 6th floor. The energized relay 6Y also closes its self-holding contact 6Y3 so that it will remain energized until its cancelling coil 4YN is energized.

The stopping of the car A at the 6th floor also causes its brush 40 to engage the contact segment f6 and thus energize the restoring coil 6DRN by the circuit L+3, 6DR1, 6DRN, f6, 40, X6, M4, L—3, to cancel the 6th floor down call. The deenergized relay 6DR recloses its back contacts 6DR2 in the circuit 50 and its contacts 6DR3 in the circuit 63.

It will be assumed now that the attendant in car A closes the car switch CS thus energizing the down direction switch D and the car running relay M as described before to run the car on down to the 1st floor, bypassing the stop call at the 4th floor.

It will be assumed now that waiting passengers at the 7th floor operate the button 7D to register a down call for that floor. The operation of the button 7D energizes the down direction relay 7DR by the circuit L+3, 7D, 7DR, 61, L—3. The energized relay 7DR closes its self-holding contacts 7DR1, opens its contacts 7DR2 to prevent operation of the high floor call relays K and BK. There are now down calls registered at the 7th and the 4th floors.

It will be assumed that the attendant in car B closes his car switch BCS and thereby starts car B on an up trip in the same manner as previously described. As car B approaches the 4th floor, its selector brush B34 engages the contact segment Bd4 and thereby energizes its high floor call relay BK by the circuit L+5, 58, 6Y1, 66, 6DR2, 5UR1, 5DR2, 4UR1, Bd4, B34, BK, L—6. The energized relay BK closes its contacts BK1 thereby energizing the high call reversing relay BJ by the circuit L+6, BJ, BH1, BK1, BW7, B27d, L—6 to close its contacts BJ1 and BJ3 and to operate its contacts BJ2. The closed contacts BJ3 complete a self-holding circuit for relay BJ. A closed contact BJ1 energizes the decelerating relay BE and the inductor relay BG of car B by the circuit L+2, BJ1, BG and BE in parallel BM1, L—2.

As car B approaches more closely to the 4th floor, its inductor relay BE meets the up inductor plate UEP for the 4th floor thus opening its contacts BE1. The open contacts BE1 deenergize the high speed relay BV to open its contacts BV1 and thus restore the resistor BR1 to the circuit of the generator BG, thus decelerating the car. The deenergized relay BV also closes its contacts BV2 to energize the stopping relay BF. As car B approaches closer to the 4th floor, its stopping relay BF meets the up stopping plate BUFP for the 4th floor which opens its contacts BF1 and thus deenergizes the up direction switch BU and the relay BM. The relay BU opens its contacts BU3, BU4, and BU1 thus applying the brake B15 and deenergizing the motor to stop the car at the 4th floor.

Inasmuch as the contacts BJ2 are open, the opening of the contacts BM2 when relay BM is deenergized also deenergizes the up direction relay BW which thereupon closes its back contacts BW2 and energizes the down direction relay BX. Car B is now stopped at the 4th floor and its direction relays BW and BX have been reversed so that next time car B is started it will move in the down direction.

It should also be observed that inasmuch as car B has stopped in the up direction at the 4th floor and its high call reversing relay J also operated to stop it and reverse it at that floor, the engagement of its brush B35 with the contact segment Be4 energizes the coil 6YN by the circuit L+5, 65, 6Y3, 6YN, 6DR3, 5DR4 Be4, B35, BJ4, BV4, BW9, L—6. The energization of the cancelling coil 6YN restores the service demand relay 6Y to its normal condition.

It will be assumed now that car B takes on the down passengers at the 4th floor and that the attendant closes the switch BCS whereupon car B starts downwardly and runs down to the lower terminal.

By this operation, it will be observed that, when a down car makes a bypassing operation, the next unloaded up moving car will stop and reverse at the highest down call below the floor of the operated bypass and that in making such stop it will cancel the bypassing demand and restore the service demand relay to its normal condition.

By the foregoing operation, it will be seen that I have provided an improved system of call control for elevator cars which will cause them to render service in accordance with the ordinary and the specific demands of service at the various floors.

Although I have illustrated and described an elevator control system embodying an example of my invention, it is to be understood that modifications thereof and changes therein may be made without departing from the spirit and scope of the invention.

I claim as my invention:

1. In a control system for a plurality of elevator cars operable past a plurality of floors, each car being provided with means to start said car and to continue said motion when started, the combination of a down switch associated with each of said floors and common to said cars; means associated with each car, responsive to an actuation of any combination of said down switches for stopping any car on its down trip at the floors associated with the actuated down switches; a by-pass switch for each car; means responsive to actuation of the by-pass switch of a down car for rendering the stopping means of that car unresponsive to actuated down switches on its down trip; and means responsive to said actuation of said by-pass switch for stopping another car on its up trip at one of said floors at which a down call has been bypassed by the operation of said by-pass switch.

2. In a control system for a plurality of elevator cars operable past a plurality of floors, each car being provided with means to start said car and to continue said motion when started, the combination of a down switch associated with each of said floors and common to said cars; means associated with each car, responsive to an actuation of any combination of said down switches for stopping any car on its down trip at the floors associated with the actuated down switches; a by-pass switch for each car; means responsive to actuation of the by-pass switch of a down car for rendering the stopping means of that car unresponsive to actuated down switches on its down trip; means responsive to said actuation of said by-pass switch for stopping another car on its up trip at one of said floors at which a down call has been bypassed by the operation of said by-pass switch; and a quota means common to all of the cars and controlled by a predetermined number of actuated down switches for preventing the stopping and reversing operation of an up car in response to an actuated by-pass switch until a predetermined number of down switches are in actuated condition.

3. An elevator system comprising a plurality of cars for serving a plurality of floors, an operating means for each car, a reversing means for each car, an up call device and a down call device for each floor for causing the operating means of any car to stop it thereat when it is in condition to make such stop, a service demand device for each floor, a by-pass device for each car, means responsive to operation of a by-pass device on a down car for operating a service demand device, and means responsive to operation of a service demand device for causing the operating means and the reversing means of an up moving car to stop it and reverse it.

4. An elevator system comprising a plurality of cars serving a plurality of floors, an operating means for each car, a reversing means for each car, an up call device and a down call device for each floor for causing the operating means of any car to stop it thereat when it is in condition to make such stop, a service demand device for each floor, a by-pass device for each car, means responsive to operation of a by-pass device on a down car for operating a service demand device, means responsive to operation of a service demand device for causing the operating means and the reversing means of an up moving car to stop it and reverse it, and a quota means common to all of the cars and operable by a predetermined number of down call devices being in operated condition for preventing operation of the stopping and the reversing means of an up moving car in response to operation of a service demand device until a predetermined number of down call devices are in operated condition.

5. An elevator system comprising a plurality of cars serving a plurality of floors, an operating means for each car, a reversing means for each car, an up call device and a down call device for each floor for causing the operating means of any car to stop it thereat when it is in condition to make such stop, a service demand device for each floor, a bypass device for each car, means responsive to operation of the bypass device of a car for rendering the operating means of that car unresponsive to operated call devices ahead of it, means responsive to operation of a bypass device when its car is making a down stop at a floor for operating the service demand device for that floor, and means responsive to operation of a service demand device and the call devices for causing the operating means and the reversing means of an up moving car to stop and reverse it.

6. An elevator system comprising a plurality of cars serving a plurality of floors, an operating means for each car, a reversing means for each car, an up call device and a down call device for each floor for causing the operating means of any car to stop it thereat when it is in condition to make such stop, a service demand device for each floor, a bypass device for each car, means responsive to operation of the bypass device of a car for rendering the operating means of that car unresponsive to operated call devices ahead of it, means responsive to operation of a bypass device when its car is making a down stop at a floor for operating the service demand device for that floor, means responsive to operation of a service demand device and the call devices for causing the operating means and the reversing means of an up moving car to stop and reverse it at the highest down call below the operated service demand device, and means responsive to the stopping and reversing operation of said up moving car for restoring the operated service demand device to its unoperated condition.

7. In a control system for a plurality of elevator cars serving a plurality of floors, a starting means for each car, a stopping means for each car, a reversing means for each car, an up call device and a down call device for each floor for causing the stopping means of the cars to stop them thereat when they are in condition to make such stops, a service demand device for each floor, a by-pass device on each car operable to effect operation of the service demand device for a floor when that car stops at that floor, a circuit responsive to operation of a service demand device for causing operation of the stopping and the reversing means of an up car at the highest operated down call device at or below the floor of the operated service demand device, and a quota means common to all of the cars and controlled by a selected group of down call devices and operable by a predetermined number of down call devices in said group being in operated condition for preventing operation of said circuit until a predetermined number of unanswered down calls accumulates in said group.

8. In a control system for a plurality of elevator cars serving a plurality of floors, including a service demand zone of floors, a starting means for each car, a stopping means for each car, a reversing means for each car, an up call device and a down call device for each floor for causing the stopping means of the cars to stop them thereat when they are in condition to make such stops, a quota means common to all of the cars and operable by a predetermined number of down call devices in the service demand zone being in operated condition, a service demand device for each floor, a bypass device on each car for causing that car to bypass stop calls ahead of it, means responsive to operation of the bypass device of a car at a floor for operating the service demand device for that floor, and means responsive to operation of the quota means and a service demand device for causing operation of the stopping and the reversing means of an up moving car at the highest operated down call device at or below the floor of the operated service demand device.

9. In a control system for a plurality of elevator cars serving a plurality of floors, a starting means for each car, a stopping means for each car, a reversing means for each car, an up call device and a down call device for each floor for causing the stopping means of the cars to stop them thereat when they are in condition to make such stops, a quota means common to all of the cars and controlled by a selected group of call devices in one direction and operable by a predetermined number of call devices in said group being in operated condition, a service demand device for each floor, a bypass device on each car, means responsive to operation of the bypass device of a car at a floor for operating the service demand device for that floor, a high call circuit controlled by the up and the down call devices, an auxiliary circuit operable by the quota means and a service demand device, and a high call above device for each car responsive to operation of the auxiliary circuit and the high call circuit when that car is approaching in direction opposite to said group of call devices for causing operation of its stopping and its reversing means to stop it and reverse it.

10. An elevator system comprising a plurality of cars serving a plurality of floors including a service demand zone, an operating means for each car, a reversing means for each car, an up call device and a down call device for each floor for causing the operating means of any car to stop it thereat when it is in condition to make such stop, a quota means common to all the cars, means responsive to a predetermined number of down call devices in the service demand zone being in operated condition for operating the quota device, a service demand device for each floor, a bypass device for each car, means responsive to operation of the bypass device of a car for rendering the operating means of that car unresponsive to operated call devices ahead of it, means responsive to operation of a bypass device when its car is making a down stop at a floor for operating the service demand device for that floor, means responsive to operation of the quota device and a service demand device and the call devices for causing the operating means and the reversing means of an up moving car to stop and reverse it at the highest down call at or below the operated service demand device, and means responsive to the stopping and reversing operation of said up car for restoring the operated service demand device to its unoperated condition.

11. An elevator system comprising a plurality of cars serving a plurality of floors including a service demand zone, an operating means for each car, an up call device and a down call device for each floor for causing the operating means of any car to stop it thereat when it is in condition to make such stop, a call above circuit, means responsive to operation of the call devices for controlling the call above circuit, car reversing means for each car responsive to the condition of the call above circuit for stopping and reversing that car at the highest down call, a quota means common to all the cars, means responsive to a predetermined number of down call devices in the service demand zone being in operated condition for operating the quota device, a service demand device for each floor, a bypass device for each car, means responsive to operation of the bypass device of a car for rendering the operating means of that car unresponsive to operated call devices ahead of it, means responsive to operation of the bypass device of a car when it is making a down stop at a floor for operating the service demand device for that floor, means responsive to operation of the quota device and a service demand device and the call devices for causing the operating means and the reversing means of an up moving car to stop it and reverse it.

12. An elevator system comprising a plurality of cars serving a plurality of floors including a service demand zone, an operating means for each car, an up call device and a down call device for each floor for causing the operating means of any car to stop it thereat when it is in condition to make such stop, call-above circuit, means responsive to operation of the call devices for controlling the call-above circuit to register operation of the call device, a car reversing means for each car responsive to the condition of the call-above circuit for stopping and reversing that car when unloaded and up-traveling at the highest down call, a quota means common to all the cars, means responsive to a predetermined number of down call devices in the service demand zone being in operated condition for operating the quota device, a service demand device for each floor, a bypass device for each car, means responsive to operation of the bypass device of a car for rendering the operating means of that car unresponsive to operated call devices ahead of it, means responsive to operation of the bypass device of a car when it is making a down stop at a floor for operating the service demand device for that floor, means responsive to operation of the quota device and a service demand device and the condition of the call above circuit for causing the operating means and the reversing means of an unloaded up moving car to stop it and reverse it at the highest down call at or below the floor of the operated service demand device, and means responsive to the stopping and reversing operation of said up car for restoring the operated service demand device to its unoperated condition.

13. In a control system for a plurality of elevator cars serving a plurality of floors, including a service demand zone of floors, a starting means for each car, a stopping means for each car, a reversing means for each car, an up call device and a down call device for each floor for causing the stopping means of the cars to stop them thereat when they are in condition to make such stops, a quota means common to all of the cars and operable by a predetermined number of down call devices in the service demand zone being in operated condition, a service demand device for each floor, a bypass device on each car for causing that car to bypass stop calls ahead of it, means responsive to operation of the bypass device of a car at a floor for operating the service demand device for that floor, a high call circuit controlled by the up and the down call devices, an auxiliary circuit controlled by the quota means and a service demand device, a high call above device for each car responsive to the condition of the auxiliary circuit and the high call circuit when that car is an unloaded up moving car for causing operation of its stopping and its reversing means at the highest operated down call device at or below the floor of the operated service demand device, and means responsive to operation of the stopping and the reversing means of said unloaded car for restoring the operated service demand device to its normal condition.

14. An elevator system comprising a plurality of cars for serving a plurality of floors including a service demand zone, a starting means for each car, a stopping means for each car, a reversing means for each car, an up call device and a down call device for each floor for causing the stopping means of the cars to stop them thereat when they are in condition to make such stops, a high call circuit controlled by the up and the down call devices, a high call above device for each car responsive to operation of the high call circuit when that car is an unloaded up moving car for operating its stopping and the reversing means at the floor of the highest operated down call device, a quota means common to all of the cars and operable by a predetermined number of down call devices in the service demand zone being in operated condition, a service demand device for each floor, a bypass device for each car, means responsive to operation of the bypass device of a car when it makes a down stop at a floor for operating the service demand device for that floor, an auxiliary circuit responsive to operation of the quota means and operation of a service demand device for operating the high call above device of an up moving car to cause operation of the stopping and the reversing means of that car.

15. An elevator system comprising a plurality of cars for serving a plurality of floors including a service demand zone, a starting means for each car, a stopping means for each car, a reversing means for each car, an up call device and a down call device for each floor for causing the stopping means of the cars to stop them thereat when they are in condition to make such stops, a high call circuit controlled by the up and the down call devices, a high call above device for each car responsive to operation of the high call circuit when that car is an unloaded up moving car for operating its stopping and the reversing means at the floor of the highest operated down call device, resistor circuit associated with each down call device at each floor in the service demand zone, a quota means common to all of the cars and connected to the resistor circuits and operable by a predetermined number of down call devices in the service demand zone being in operated condition, a service demand device for each floor, a bypass device for each car for rendering the operating means of that car unresponsive to operated call devices, means responsive to operation of the bypass device of a car when it makes a down stop at a floor for operating the service demand device for that floor, and an auxiliary circuit responsive to operation of the quota means and operation of a service demand device for operating the high call above device of an up moving car to cause operation of the stopping and the reversing means of that car.

16. An elevator system comprising a plurality of cars for serving an upper terminal floor, a lower terminal floor, and a plurality of intermediate floors, a starting means for each car, a stopping means for each car, a reversing means for each car, an up call device and a down call device for each intermediate floor for causing the stopping means of the cars to stop them thereat when they are in condition to make such stops, a high call circuit controlled by the up and the down call devices and common to all the cars, a high call above device for each car responsive to operation of the high call circuit when that car is an unloaded up moving car for operating its stopping and the reversing means at the floor of the highest operated down call device, a plurality of resistor circuits and means for adjustably connecting them for a plurality of floors to define a service demand zone, a quota means common to all of the cars and connected to the resistor circuits and operable by a predetermined number of down call devices in the service demand zone being in operated condition, a service demand device for each floor, a bypass device for each car for rendering the operating means of that car unresponsive to operated call devices, means responsive to operation of the bypass device of a car when it makes a down stop at a floor for operating the service demand device for that floor, an auxiliary circuit responsive to operation of the quota means and operation of a service demand device for operating the high call above device of the next unloaded up moving car to cause operation of the stopping and the reversing means of that car at the highest operated down call device below the floor of the operated service demand device, and means responsive to operation of the stopping means and the reversing means of said unloaded car for restoring the operated service demand device to unoperated condition.

17. In an elevator system for a building having a plurality of floors including an upper terminal floor and a lower terminal floor, a plurality of elevator cars for serving the floors, operating means for operating each of the elevator cars in either direction of travel between the terminal floors, reversing means for each of the elevator cars, a call device for each of a number of said floors cooperating with the operating means for stopping any of the cars at any floor at which the call device is actuated when the car is traveling in a predetermined direction between the terminal floors and is approaching the floor of the actuated call device, a by-pass device for each of the cars, each of the by-pass devices being effective when actuated for preventing the associated car from stopping at a floor at which one of the call devices is actuated, and means responsive to actuation of a by-pass device on a first one of the elevator cars traveling in the predetermined direction for conditioning a second elevator car traveling in a direction opposite to the predetermined direction to stop and reverse at a floor call by-passed by the first car.

18. An elevator system as defined in claim 17 wherein when a plurality of floor calls are unanswered between the point at which the first elevator car initiated its by-passing operation and the terminal floor which is being approached at the time by the first car, the last-named means is effective for stopping and reversing the second elevator car at that one of said plurality of floor calls which is remote from the last-named terminal floor.

HAROLD W. WILLIAMS.

REFERENCES CITED

The following references are of record in the file of this patent:

UNITED STATES PATENTS

| Number | Name | Date |
| --- | --- | --- |
| 2,231,741 | Williams et al. | Feb. 11, 1941 |